United States Patent [19]
Johnson et al.

[11] Patent Number: 5,528,865
[45] Date of Patent: Jun. 25, 1996

[54] INSULATED PLASTIC MOLDED DOOR WITH INTEGRAL HINGE

[75] Inventors: Carl Johnson, Redmond; Michael Cloyd; Thomas McCormick, both of Bend, all of Oreg.

[73] Assignee: Chase/Durus Industries, Cincinnati, Ohio

[21] Appl. No.: 299,990

[22] Filed: Sep. 1, 1994

[51] Int. Cl.⁶ .................................................. E06B 3/00
[52] U.S. Cl. .............................. 49/501; 49/383; 49/388; 49/397; 49/398
[58] Field of Search .............................. 49/397, 501, 388, 49/398, 34, 9, 236, 237, 383; 160/354

[56] References Cited

U.S. PATENT DOCUMENTS

| | | | |
|---|---|---|---|
| 2,774,117 | 12/1956 | Eckel | 49/397 |
| 3,498,001 | 3/1970 | MacDonald | 49/501 |
| 3,660,941 | 5/1972 | Shibuya. | |
| 3,827,183 | 8/1974 | Zimmerman et al. | 49/388 X |
| 3,962,827 | 6/1976 | Chaffee. | |
| 3,979,872 | 9/1976 | Gilchrist et al. | 49/501 X |
| 4,078,334 | 3/1978 | Lambias | 49/237 |
| 4,084,347 | 4/1978 | Brown. | |
| 4,478,005 | 10/1984 | Mundschenk. | |
| 4,483,102 | 11/1984 | Edwards. | |
| 4,570,384 | 2/1986 | Eckel | 49/237 X |
| 4,686,806 | 8/1987 | Bennett. | |
| 5,327,682 | 7/1994 | Holtz. | |

Primary Examiner—Philip C. Kannan
Attorney, Agent, or Firm—Townsend and Townsend and Crew

[57] ABSTRACT

A high impact resistant rotationally molded door and process for molding the door is disclosed in which a hinge member is integrally molded to the door along one edge only. This hinge member forms to the hollow door edge without door warpage during curing and shrinking of rotationally molded plastic door body. Door warpage is avoided by delaying full integral attachment of the hinge member to the door until curing of the injected foam interior which both bonds to the interior of the door and the hinge member. An improved seal and hinge seal is disclosed together with a placed window construction that can include both placement and shaping to meet the special order needs.

5 Claims, 5 Drawing Sheets

INSULATED PLASTIC MOLDED DOOR WITH INTEGRAL HINGE

This invention relates to an improvement on a hollow rotationally molded and foamed filled high impact resistant insulated door. Specifically, a molded door is disclosed which includes a hinge bar integrally molded to the plastic door to both simplify door construction and obviate through bolting of cast hinge members to the finished door product. An improved air barrier is disclosed for use with the door to provide an air barrier in the vicinity of the integrally attached hinge member as it protrudes at the corners of the door adjacent the edge of the integrally molded hinge

BACKGROUND OF THE INVENTION

In Brown U.S. Pat. No. 4,084,347 issued Apr. 18, 1978 entitled High Impact Resistance Door, there is described a rotationally molded hollow body door which is foamed-in-place in the interior of the hollow door with insulating material. A gasket construction is shown molded into the door edges.

This door requires the use of an integral two part mold which anticipates window placement. Further, reinforcing members are inserted through cuts within the rotationally molded structural skin of the door after rotational molding but before foaming to inhibit door warpage. After foaming, and during completion of the door assembly, the structural skin of the door is again cut at the door hinge corners and cast and molded hinge members are placed on the door. While the disclosed door is of sturdy construction, what follows is a simplified construction method and resultant door having greater flexibility, lower cost and higher commercial applicability.

SUMMARY OF THE INVENTION

A high impact resistant rotationally molded door and process for molding the door is disclosed in which a hinge member is integrally molded to the door along one edge only. This hinge member forms to the hollow door edge without door warpage during curing and shrinking of rotationally molded plastic door body. Door warpage is avoided by delaying full integral attachment of the hinge member to the door until curing of the injected foam-interior which both bonds to the interior of the door and the hinge member.

A mold fabricated from back side reinforced aluminum sheet is disclosed. This mold has an interior for defining a hollow rotationally molded six sided door. A mold cavity is provided including a front door surface, a top door edge, a bottom door edge, a hinge door edge, and an opening door edge. The mold is closed and opened at a flat plat surface which also forms the rear door edge. When closed, the surfaces of the mold form an integral hollow cavity. Plastic, when placed into this hollow cavity and rotationally molded, forms a hollow plastic door body on the interior surface of the mold with the inner portion of the plastic door body being hollow.

The mold further defines an upper hinge cavity in the upper door corner in the front door surface, rear door surface, top door edge and hinge door edge. A lower hinge cavity is defined in the lower door corner by the mold in the front door surface, rear door surface, bottom door edge and hinge door edge. An elongate hinge member is placed in the mold extending along the hinge door edge within the integral hollow cavity of the door and extending into the upper hinge cavity and the lower hinge cavity.

A release agent coating is applied to extend interior of the integral hollow cavity of the door adjacent the upper hinge cavity and the lower hinge cavity. The portion of the hinge member in the middle of the door is left un-coated. In the preferred embodiment, the hinge member includes an attached protruding portion—such as hollow square bar—for secure attachment to the door when subsequently filled with foam.

Plastic is placed in the mold and rotationally molded. The plastic adheres to the interior surfaces of the mold to form a hollow plastic door body having the front surface, the rear surface, the top door edge, the bottom door edge, the hinge door edge, and the opening door edge with the upper and lower hinge member cavities defined in the door. Such integral bonding does not occur to the release agent coated portions of the hinge member adjacent the upper and lower hinge cavities. The door can then shrink relative to the hinge member during curing of the outer plastic body of the door. The result is that the rotationally molded hollow door is not warped or bent out of a plane configuration by the attached hinge member along only one edge of the door during curing and shrinking of the hollow plastic body of the door.

Thereafter, a foam filler is injected interior of the door integrally bonded within the integral hollow cavity of the door. At this time, the hinge member and its attached protruding portion integrally bond to the door. There results the simplified integral hinge member bonded to the finally fabricated foam enclosing door.

There is also disclosed an improved hinge seal for use with the door. Simply stated, and in the vicinity of the upper and lower hinge cavities, there is attached to the jamb an semi-rigid arcuate member. This semi-rigid arcuate member mates with a door mounted channel contained within the hinge cavity. As the door opens and closes, an air seal is maintained between the semi-rigid arcuate member and channel, effectively providing an air barrier at the hinge recess.

DESCRIPTION OF THE PREFERRED EMBODIMENT

Figure 7:
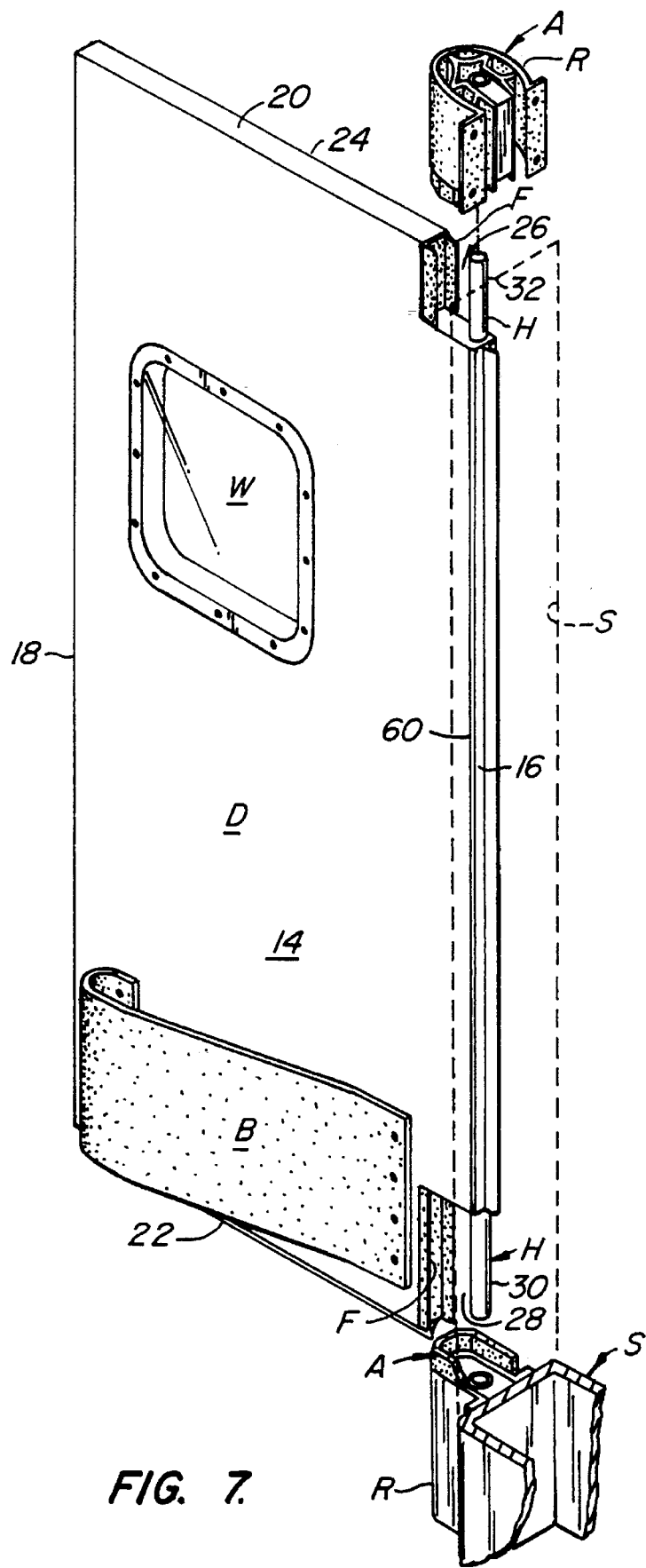
FIG. 7 is a perspective view of a completed and installed door according to this invention; and, FIG. 8 is a detail of the mold of this invention at the integrally fastened hinge member illustrating the coating of the hinge member and its placement to the mold.

Referring to FIG. 7, door D is shown mounted to sill S along hinge axis A. Door D includes front surface 14, rear surface 24, and respective hinge edge 16, opening edge 18, top edge 20, and bottom edge 22. A single hinge member H is integrally molded to the hollow door body Y (the door body shown in FIG. 3). This hinge member H protrudes into upper hinge cavity 26 at the upper hinged corner of the door and lower hinge cavity 28 at the lower corner of the door.

Opening and closing of door D is conventional and can be easily understood. Specifically, bottom hinge member portion 30 protrudes into a conventional hinge bearing where hinge member H at bottom hinge member portion 30 can rise and fall as door D respectively opens and closes. Top hinge member portion 32 is conventionally attached to a conventional V-cam door closure mechanism. This mechanism causes the door D to raise upon opening, and descend upon closing against a conventional V-cam door closure mechanism. Such a mechanism can be obtained from Chase-Duris Industries of Bend, Oreg. under the product designation 5508.

It will therefore be understood that upper hinge cavity 26 and lower hinge cavity 28 are necessary so that door D can rise and fall during opening on hinge member H. This being the case, these respective hinge cavities must be prevented from venting air through jamb S when door D is in the closed position. To prevent this from occurring, door attached U-shaped flange F and jamb attached arcuate air stop R is utilized.

Having generally described the door product of this invention as installed, and description of the process of manufacture of door D can now be set forth.

Figure 2:
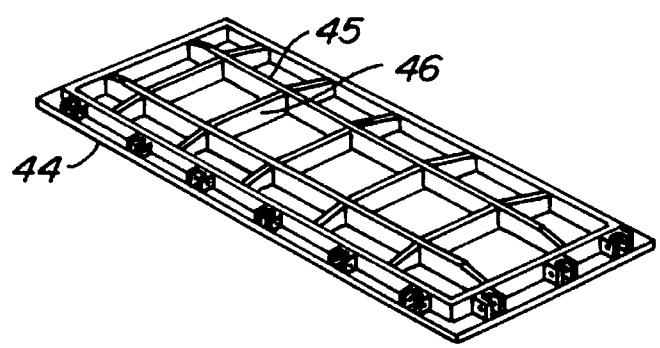
FIG. 2 is a perspective view of the mold only with the top plate shown in exploded relation overhead illustrating the placing and spreading of plastic within the mold and the integrally fastened hinge bar placed to the mold with the top and bottom areas of the hinge having mold release being differentiated from the rest of the hinge bar.
Figure 2:
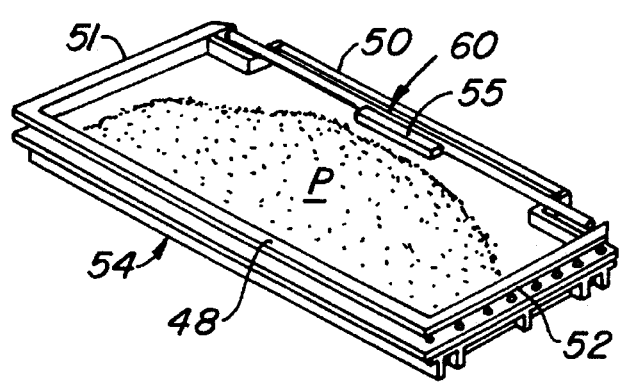

Referring to FIG. 2, mold M for rotational molding of door D is set forth. The two major surfaces of door D including front surface 14 and rear surface 24 are molded across front surface aluminum sheet 44 and rear surface aluminum sheet 54. Each of these sheets is reinforce on the reverse side by longitudinal reinforcing members 45 and transverse reinforcing members 46, such reinforcing members only visible with respect to front surface aluminum sheet 44.

Rear surface aluminum sheet 54 has attached thereto U-shaped channels forming mold opening side edge 48, mold hinge side edge 50, mold top edge 51, and mold bottom edge 52. It will thus be seen that rear surface aluminum sheet 54 with its respective fastened edges forms cavity C into which plastic P can be placed for rotationally molding door D. It will be realized that when mold M is closed by front surface aluminum sheet 44 that hollow mold M will be formed.

It is required that hinge member H be integrally molded to hollow door body Y. To understand this feature of the invention, reference must be made to FIG. 8.

Figure 8:
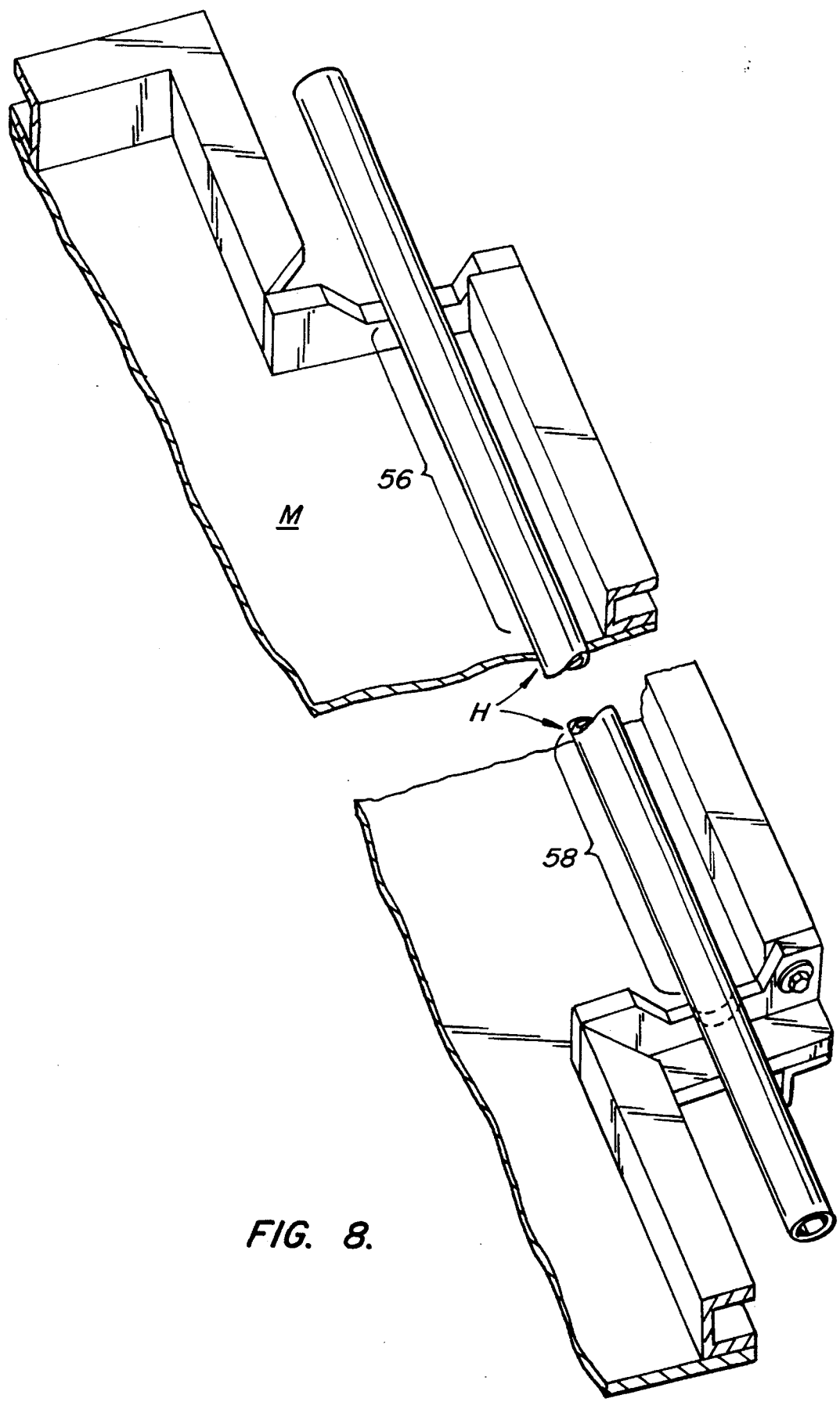

Referring to FIG. 8, hinge member H is shown placed interior of mold M. Hinge member H includes 1¼ inch diameter bar having square key section 55 welded thereto (See FIG. 2). Mold M defines an inner dimension of 1½ inches. It is important that hinge member H having those portions of the bar adjacent upper hinge cavity 26 and lower hinge cavity 28 coated with release agent.

Accordingly, hinge member H at upper member section 56 and lower member section 58 is coated with release agent. As is conventional, the interior of mold M is also coated with a release agent. Medial portion 60 of hinge member H including square key section 55 is left un-coated. The effect of this release agent coating of upper member section 56 and lower member section 58 during conventional rotational molding is easy to understand.

Specifically, plastic P molds to all interior portions of mold M. Such molding of plastic will also occur around hinge member H at the boarders of mold M. Molding of plastic will generally not occur to portions of hinge member H between upper member section 56 and lower member section 58.

Plastic attaching to hinge member H at upper member section 56 and lower member section 58 will be free to move. The result is that when rotational molding has occurred, hollow door body Y and hinge member H will form an integral linear member with only local attachment of hinge member H at those portions of hollow door body Y through which hinge member H protrudes. Final, integral attachment of hinge member H to door D will await filling of hollow door body Y with foam.

It will be understood that molding a member such as door D with integrally molded hinge member H has not heretofore been possible without significant warping of the molded member, here door body Y. Specifically, and in absense of both the release agent here utilized and the diclosed foaming sequence, such a single side member would cause door warpage upon curing of the door.

Figure 1:
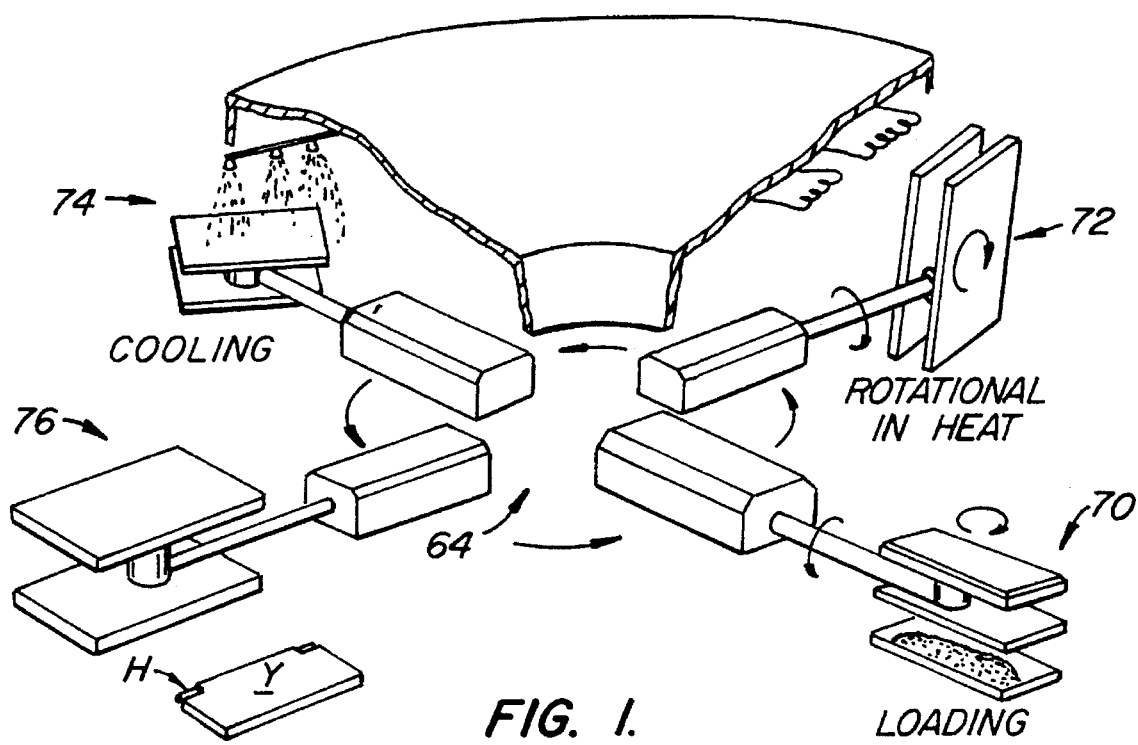
FIG. 1 is a perspective view of a turret type station apparatus including a first station for loading the mold of this invention, a second station for the oven contained rotational molding of the loaded mold, a third station for the cooling of the mold; and a fourth station for unloading and storing the mold.

Referring to FIG. 1, rotational molding is relatively easy to understand. Schematically, a turret type multiple station rotational molding station 64 is illustrated. It includes mold loading station 70, mold rotating station 72, mold cooling station 74, and product discharge station 76. At the end of rotational molding, there is discharged hollow door body Y having hinge member H integrally molded thereto.

Figure 3:
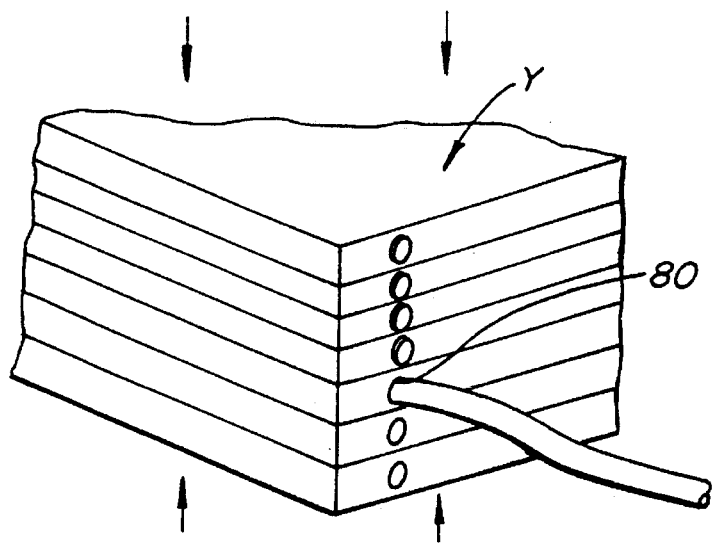
FIG. 3 is a view of the rotationally molded and removed door being injected with foam within a schematically indicated press to preserve the linearity of the door, the press here being illustrated including a group of doors.

Typically, and after rotational molding of hollow door body Y, the door product is allowed to sit for a period of 24 hours. Thereafter, and as shown in FIG. 3, foam injections occurs through aperture 80 and hose 82 from conventional foam producing apparatus (not shown). Such foam injection finally causes hinge member H to integrally bond to door D.

Figure 4:
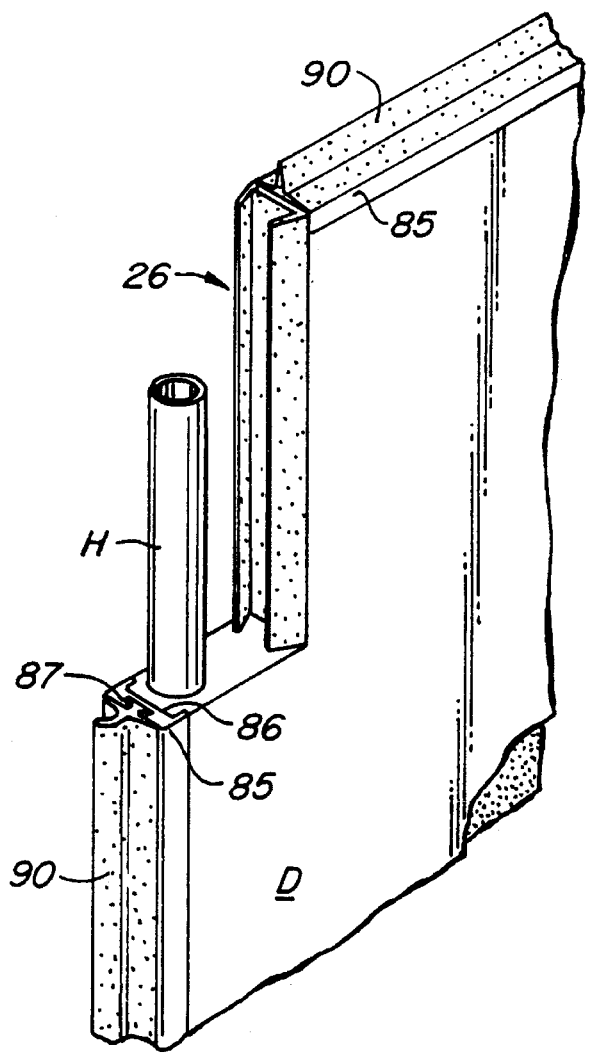
FIG. 4 is a perspective view of a section of the door at the upper hinge corner having an edge for receiving a gasket shown with the inserted and replaceable gasket and illustrating a hinge member air dam channel adjacent the protruding integral hinge bar at the upper portion thereof.

Once this has occurred, door D filled with foam is allowed to sit further for 24 hours. Thereafter, the respective hinge edge 16, opening edge 18, top edge 20, and bottom edge 22 are milled to receive gasket molding 85. As can be seen in FIG. 4, gasket molding 85 has door edge side 86 configured to fit to the milled door edges. Further, gasket molding 85 defines gasket receiving slot 87 to receive gasket 90 at the respective hinge edge 16, opening edge 18, top edge 20, and bottom edge 22.

Once gasket 90 has been installed, window W is placed in door D. Specifically, window hole 100 is first placed in door D and drilled with bolt apertures 101. Thereafter, front window flange member 104, and rear window flange member 105 trap window paine 106 there between.

In observing the installation of window W, it will be understood that placement of window W is independent of the construction of mold M. This being the case, the size, shape, and location of window W can be varied to suit customer preference on a special order basis.

It will be noted that door D includes an installed bumper B in FIG. 7. Such bumpers B are conventional; they will not be further discussed here. Having set forth the door construction, attention can now be devoted to sill attached arcuate air stop R.

Figure 5:
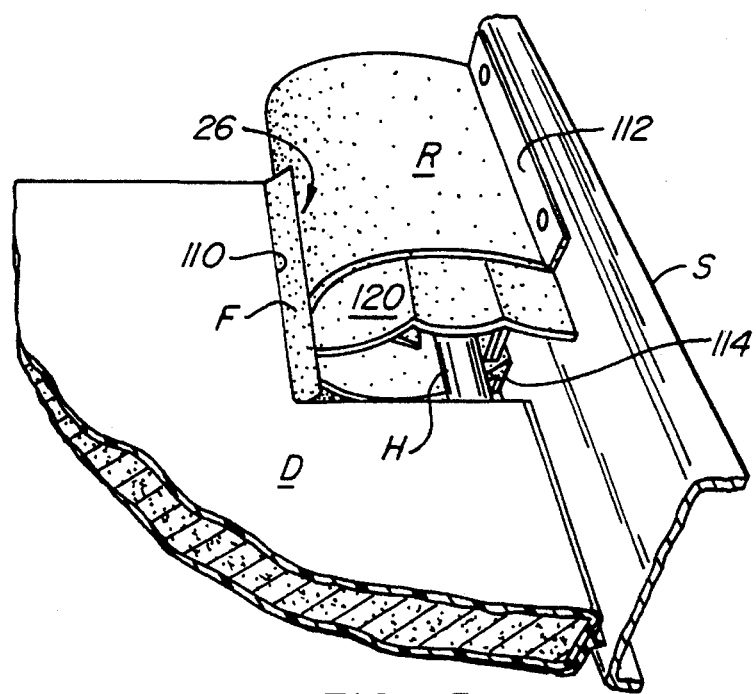
FIG. 5 is a perspective view of the upper hinge corner shown in FIG. 4 with the hinge member air dam mounted to the door jamb and co-acting with the hinge member air dam channel to provide insulation of the interval at the hinge to enable working insulation of the door at the hinge interval.
Figure 6:
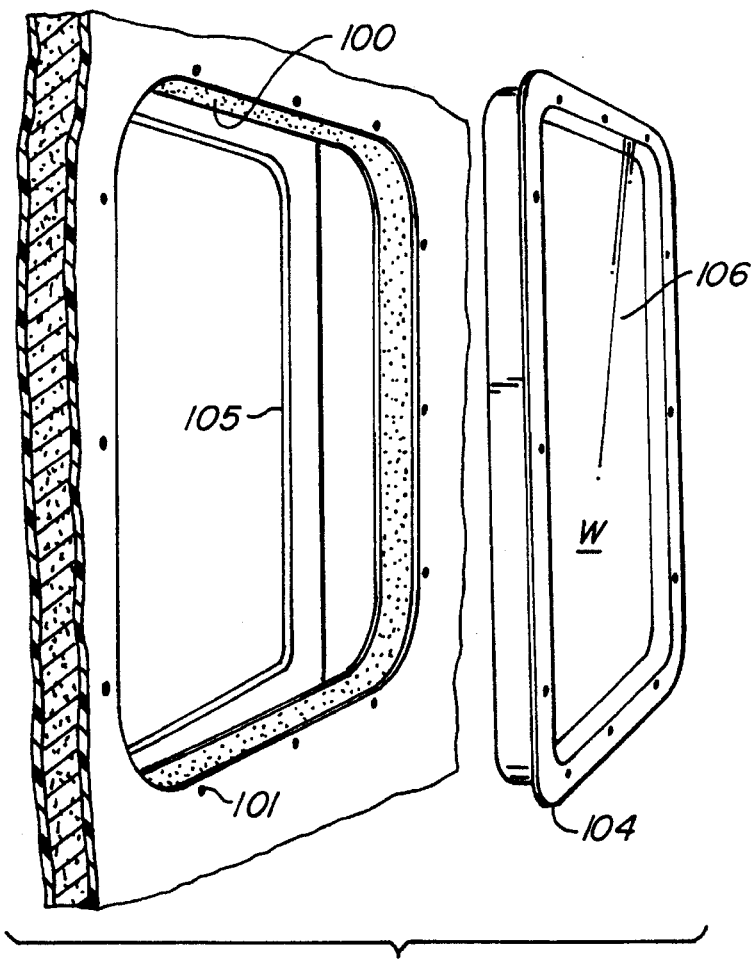
FIG. 6 is a perspective view of a window being installed to the foam filled rotationally molded door.

Referring to the perspective detail of FIG. 5, door D at upper hinge cavity 26 is illustrated. Door D on vertical cavity edge 110 includes U-shaped flange F. jamb S has fixed thereto jamb attached arcuate air stop R. This sill attached arcuate air stop R fastens at first arcuate end 112 to jamb S, extends around hinge member H, and fastens at second arcuate end 114 to jamb S. In such extension, sill attached arcuate air stop R is given a length so that it contacts U-shaped flange F. Thus during opening and closing of door D, contact of jamb attached arcuate air stop R with U-shaped flange F will continuously occur.

It will be remembered that door D rises and falls during respective opening and closing. This being the case, some provision at jamb attached arcuate air stop R is desirable. Accordingly, slotted skirt 120 is placed adjacent the lower edge of upper hinge cavity 26. Similarly, a slotted skirt 120 is placed at the upper portion of jamb attached arcuate air stop R on lower hinge cavity 28. It will be understood that at upper hinge cavity 26, conventional V-cam door closure mechanism is enclosed by jamb attached arcuate air stop R. As this conventional V-cam door closure mechanism is conventional, it is not here illustrated.

It will be understood that a particularly advantageous door construction is illustrated. Over the prior art, both door construction and cost of manufacture is simplified and lowered.

What is claimed is:

1. A high impact resistant door comprising in combination:

a rotationally molded six sided plastic door body including;

a front door surface;

a rear door surface;

a top door edge;

a bottom door edge;

a hinge door edge; and, an opening door edge;

said surfaces and edges forming an integral hollow cavity in the interior of said plastic door body;

an upper hinge cavity defined in an upper corner of said door at said hinge door edge in said front door surface, rear door surface, top door edge and hinge door edge;

a lower hinge cavity defined in a lower corner of said door at said hinge door edge in said front door surface, rear door surface, bottom door edge and hinge door edge;

an elongate hinge member rotationally molded to said door and extending along said hinge door edge within said integral hollow cavity of said door and extending into said upper hinge cavity and said lower hinge cavity free of the rotationally molded plastic of said door;

said elongate hinge member having two end portions adjacent to but not within said upper and lower hinge cavities molded about but not integrally attached to said rotationally molded plastic of said door body; and, a foam filler interior of said door within said integral hollow cavity and placed about said elongate hinge member of said door.

2. A high impact resistant door according to claim 1 and comprising in combination:

said elongate hinge member as rotationally molded to said door has an attached member keying to said foam filler interior of said rotationally molded door body.

3. A high impact resistant door according to claim 1 and comprising in combination:

a molded gasket retaining member having a female gasket receiving groove is attached to said door at said edges; and, a gasket having a mating male gasket edge and a protruding sealing lip is mounted to said female gasket receiving groove of said molded gasket retaining member.

4. In a high impact resistant insulated door having a door jamb mounted hinge attached side for closure on hinge members urging door closure assisted by the gravity of the door, said door including:

a front door surface;

a rear door surface;

a top door edge;

a bottom door edge;

a hinge door edge; and, an opening door edge;

an upper hinge cavity defined in an upper corner of said door at said hinge door edge in said front door surface, rear door surface, top door edge and hinge door edge;

a lower hinge cavity defined in a lower corner of said door at said hinge door edge in said front door surface, rear door surface, bottom door edge and hinge door edge;

at least one elongate hinge member attached to said door and extending into said upper hinge cavity and said lower hinge cavity free of the rotationally molded plastic of said door; and, means for sealing said upper and lower hinge cavity against air flow during movement of said door; the improvement to said means for sealing including:

a channel affixed to said door at said hinge cavity parallel to said elongate hinge member of said door; and, a semi-rigid arcuate member having a first end portion attached to said jamb adjacent said hinge member, a second portion attached to said jamb adjacent said hinge member, and extending arcuately between said first and second portions into contact with said channel affixed to said door to form an air barrier.

5. In a high impact resistant insulated door having a door jamb mounted hinge attached side for closure on hinge members urging door closure assisted by the gravity of the door according to claim 4 and wherein:

said semi-rigid arcuate member further includes depending slotted members for contact with said hinge cavity during rising and falling of said door during opening and closing of said door.

* * * * *